Jan. 24, 1950
H. J. MORAN
2,495,341
PORTABLE PARACHUTE ASSEMBLY
Filed Oct. 29, 1947
2 Sheets-Sheet 1
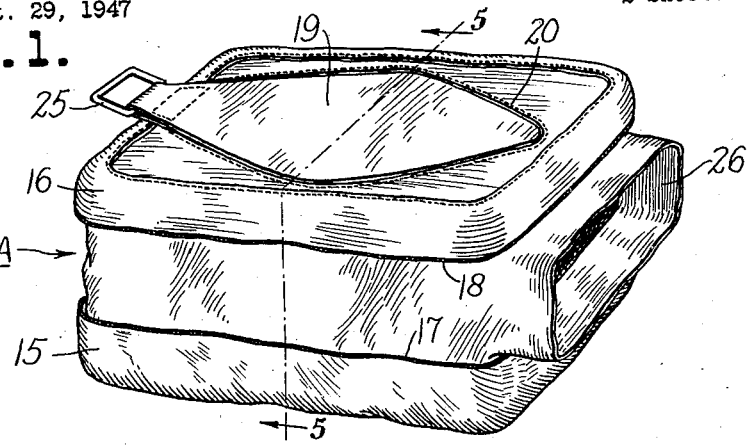
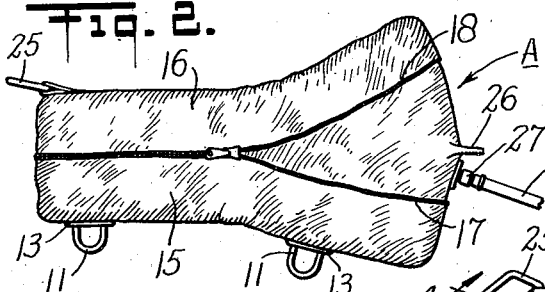
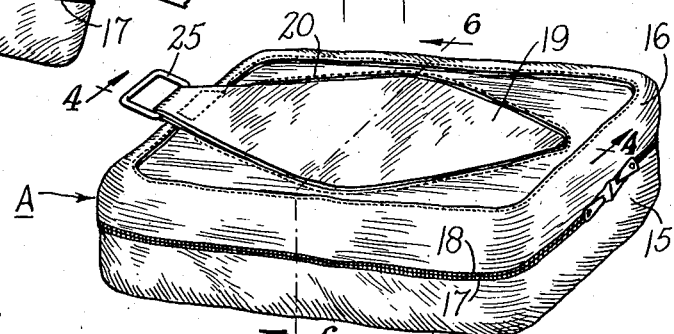
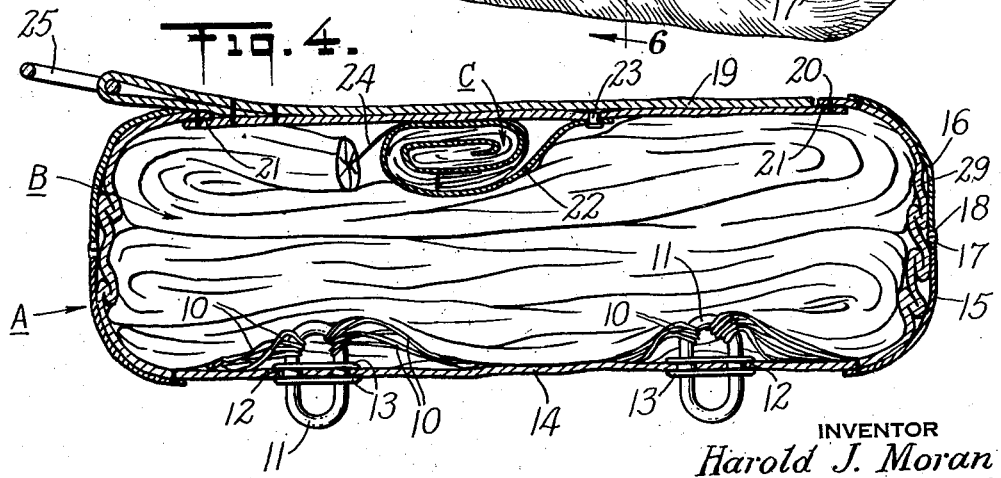
INVENTOR
*Harold J. Moran*
BY
*Blair, Curtis & Hayward*
ATTORNEYS

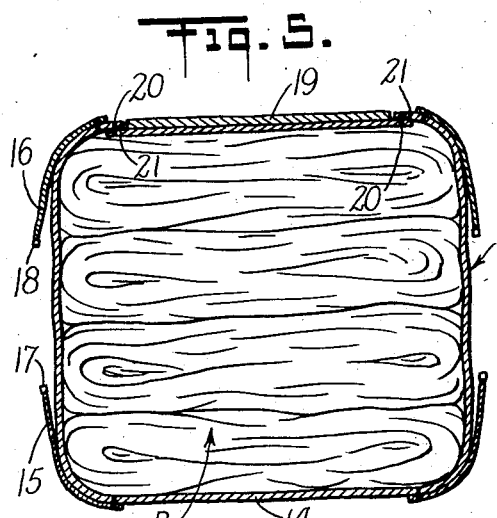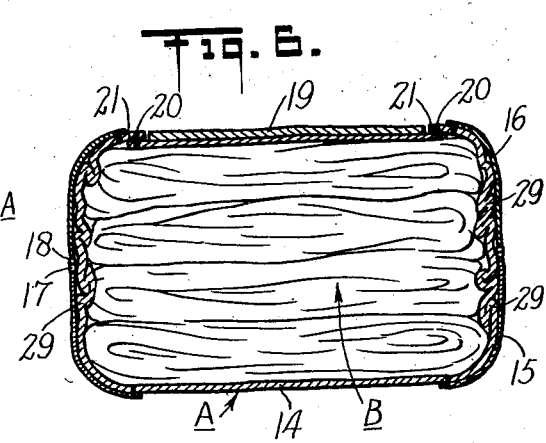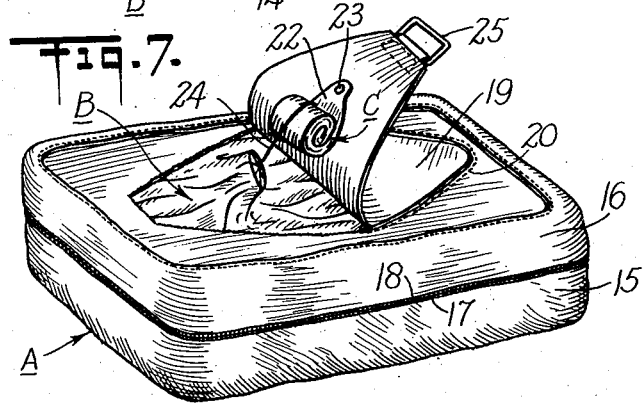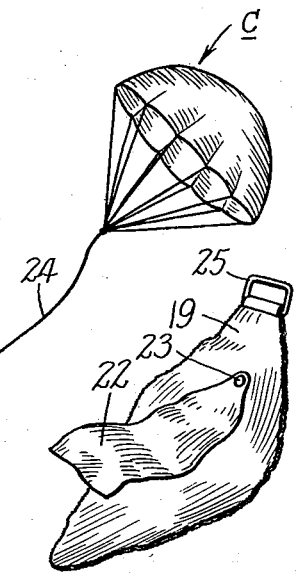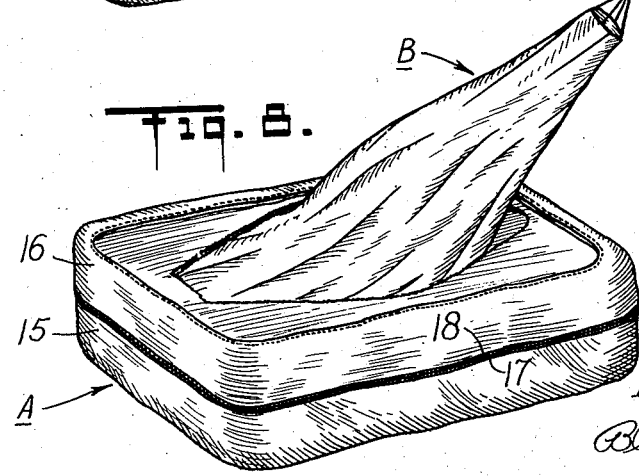

Patented Jan. 24, 1950

2,495,341

UNITED STATES PATENT OFFICE 2,495,341

PORTABLE PARACHUTE ASSEMBLY

Harold J. Moran, Trenton, N. J., assignor to Switlik Parachute Company, Inc., Trenton, N. J., a corporation of New Jersey Application October 29, 1947, Serial No. 782,725

12 Claims. (Cl. 244—148)

An object of the invention resides in the provision of a portable parachute pack that is so constructed that the canopy with its suspension lines will be preserved against deterioration over long periods of time, so that the pack, once assembled, may be stored for future use with the assurance that the canopy and its connectors to the load will be in efficiently usable condition.

A further object of the invention resides in the provision of a pack having the above set forth characteristics which may take the form of either a back pack, a seat pack or a chest pack, and may be of the quick attachable type as well as of other types.

Another object of the invention resides in the provision of a container for the reception of the canopy and the suspension lines which is so constructed that the canopy and suspension lines may be sealed therein, the moisture being substantially removed from the sealed container and prevented from again entering thereinto.

It is another object of the invention to provide a hermetically sealed parachute pack of such a portable type wherein the canopy is stored in a space from which the air has been substantially evacuated, and into which the air is prevented from re-entering, and in another aspect of the invention it is contemplated that that space will be filled with a substantially moisture-free or inert gas under pressure either less than, equal to or greater than atmospheric pressure.

Another object of the invention resides in so constructing such a hermetically sealed portable pack that the container will carry separable fastener elements attached to the suspension lines of the canopy on the inside of the container and attachable to complemental separable fastener elements on a harness.

It is another object of the invention to provide a hermetically sealed pack of the character above set forth wherein a portion of the container is severable from the remainder of the container under the influence of a force applied through a ripcord handle or through a static line; and in so constructing the device that said portion is so interconnected with the canopy that the latter will be caused to deploy from the container when the said portion of the container is freed from the remainder of the container; specifically it is an object of the invention to provide the said severable portion of the container with a pilot chute ejector which is brought into operation by and during the severance and removal of said portion of the container.

With these and other objects in view, which other objects will appear as the description of this invention progresses, the invention resides in the combination and arrangement of parts set forth in the specification, in the drawings, and recited in the claims.

In the drawings which disclose the presently best known embodiment of my invention for the purpose of illustrating the principle thereof and its practical application:

Figure 1 is a perspective view of a device constructed in accordance with my invention before the parachute canopy has been packed therein;

Figure 2 is a side elevation of said device after the canopy has been packed therein, the container sealed and while the air is being evacuated therefrom and the container covers being closed;

Figure 3 is a perspective view of said device after it has been entirely closed and is ready for use;

Figure 4 is a vertical sectional view on line 4—4 of Figure 3 looking in the direction of the arrows;

Figure 5 is a vertical sectional view on the line 5—5 of Figure 1 looking in the direction of the arrows;

Figure 6 is a vertical sectional view on line 6—6 of Figure 3 looking in the direction of the arrows;

Figure 7 is a perspective view showing the first operation involved in releasing the parachute canopy and in which the pilot chute ejector is disclosed as partly lifted from the body of the pack; and Figure 8 is a perspective view showing the second step involved in the deploying of the canopy from the container and in which the pilot chute ejector has been completely detached.

The invention comprises, broadly stated, a flexible hermetically sealed container in which a canopy and its associated load connectors are located and the interior of which container is substantially free of moisture and other substances deleterious to the canopy.

The container may be substantially evacuated of air and remain so until the parachute is used or the air may be replaced by another gas not injurious to the canopy.

The container and the canopy and its associated parts that are packed therein are compacted after the initial packing so as to reduce the size of the pack as much as is desirable and still have the pack remain in such condition that it will fall within the category of what are presently known as soft packs.

The container is so constructed that it may be opened by the user to free the canopy to deploy therefrom and this deploying may be initiated by the drawing of a pilot chute from the container by the user as he opens the pack. The canopy and its associated parts may be of the usual materials and the usual constructions, as the particular forms of the canopy and associated parts are not of importance except where the load attachments pass through the container.

An example of such a canopy showing its association with the pack may be found in United States Letters Patent No. 2,014,344, dated September 10, 1935.

The container may be formed of rubber, plastic, rubberized or plasticized fabric, or indeed any other flexible materials that have the characteristics of preventing the passage of air or other equivalent gas and moisture therethrough. Moreover the releasing means for the canopy may be in the form of what I shall term a closure that forms a part of the main body portion of the container and is constructed and arranged in such manner that it may be removed by the application of a pull to open the container and yet it will permit the remainder of the container to maintain its form to facilitate the deploying of the canopy therefrom.

In the form of the invention disclosed in the drawings the container, which is formed of a flexible material that is impervious to air or an equivalent gas and to moisture, is indicated generally by the reference character A, the canopy is indicated by the reference character B and the pilot chute by the reference character C.

When the container is closed as shown in Figure 3 the canopy and the pilot chute are packed within the container, as shown in Figure 4 of the drawings. Also the suspension means from the canopy which may be of any of the well known forms are located within the container. These suspension means are indicated by the reference numeral 10 and they are attached to coupling members 11 which extend through the wall of the container and are sealed as at 12 as, for instance, by the two plates 13. The sealing action of the plates may be augmented by an adhesive between the plates and the adjacent portion of the container. The outer portions of the coupling members 11 are for attachment to the load-carrying harness and may be used either for attachment to a harness, used for a seat, pack or chest pack. Moreover these coupling members are such that they may be used for either a permanently attached or quick detachable or attachable pack.

The container is formed of a body portion 14 which in its packed form is completely closed. Flaps 15 and 16 are secured to the body portion around its perimeter and carry complemental separable fastener elements such as zippers 17 and 18 for detachable engagement with each other so that the pack may be drawn from the condition illustrated in Figure 5 to the condition shown in Figures 3, 4 and 6.

One wall of the body portion of the pack is provided with a closure member 19 in the form of a gore (or gusset) which in effect completes the wall. It may be secured to the wall by stitching or equivalent means such as adhesive, or it may be an integral part of the wall with its juncture with the wall somewhat weaker than the wall itself or the closure, so that when the closure is ripped out of place the severance from the main portion of the wall will be along a very definite line in the drawing. I have shown this closure as both stitched and secured by an adhesive, the stitching being at 20 and the adhesive at 21, but it is to be understood that one or the other, or both, may be used, and, as I have stated, that they may be replaced by making the closure integral with the body portion and weakened along its juncture line.

The closure 19 preferably carries an ejector 22 which is secured thereto and which is wrapped with the pilot chute in the manner illustrated in Figure 4 of the drawing, and similar to that illustrated in co-pending application Serial No. 727,905, filed February 11, 1947, the peak of the pilot chute and the end of the ejector being placed together and rolled together toward the point of securement 23 of the ejector to the closure 19, so as to leave the pilot chute connector 24 extending from the ejector to the peak of the canopy B and so that when the closure is ripped from the pack and separated therefrom the pilot chute will be withdrawn from the pack and released from the ejector so that it may function thereafter to withdraw the canopy from the opening created in the pack by the severance of the closure therefrom.

To facilitate the removal of the closure from the body of the pack the closure is provided with a loop 25 which in a free jump pack may be used as a rip handle or may be used to connect the closure to the aeroplane in a static jump.

It of course will be understood that the material of which the container is constructed may be of different character, it being important that it be such that it will be impervious to air or other similar gas, and to moisture.

In assembling the device, after the flaps 15 and 16 have been secured thereto and the closure 19 emplaced, the end 26 of the container remains open and the container at this time is of such size that it will accommodate the various elements such as illustrated in Figure 4 when they are loosely packed. Preferably the canopy B is folded back and forth as shown in Figure 5, with the peak adjacent the closure 19 and the pilot chute C rolled up with the ejector 22, the ejector being on the opposite side of the pack to that which is occupied by the coupling members 11.

After the canopy and its associated parts or elements have been stowed away, the edges of the opening 26 of the container are sealed together and the air is evacuated from the container. This is accomplished through a valve 27 and an evacuating mechanism conventionally represented at 28. As the air is evacuated from the container the flaps 15 and 16 are pulled together, the separable fastener elements engaged and the flaps held together by the separable fastener elements 17 and 18, the connector 28 of the evacuating mechanism being removed before the final engagement of the separable fastener elements adjacent the valve 27.

During evacuation of the air from the container and the engagement of the complemental separable fastener elements 17 and 18, the pack is compressed, which compression is made possible by the evacuation of the air, and as it is compressed the flaps 15 and 16 and the opposite walls of the container will maintain a relatively smooth but flexible form. However, the portions of the container which are encircled by the flaps 15 and 16, when they are in their engaged positions, will fold as shown conventionally at 29 in Figure 6 of the drawings, which will enable the opposite walls of the pack to be drawn together so the pack will ultimately attain the form shown in Figure 3 of the drawings.

The invention contemplates not only the evacuation of the air and moisture from the container in the manner heretofore described, but the injection of a gas into the container after the flaps 15 and 16 have been drawn together and secured almost completely but insufficiently to prevent the use of the valve 27. The gas, of course, shall be of such a character that it is not deleterious to the canopy or the other parts of the assembly encased in the container. Such gases are well known to the art and it is thought need not be here set forth in detail but as an example moisture-free helium will be satisfactory.

When it is desired to open the pack to allow the canopy to deploy therefrom, it is only necessary to apply such force to the connector 25 as will rip the closure 19 from the wall of the container. This will permit the escape of the canopy and the escape may be facilitated by a further movement of the closure to unwrap the ejector 22 from the pilot chute C, during which unwrapping the pilot chute will be withdrawn from the container and thereafter will act to withdraw with it the canopy and the load suspension means that are connected to the coupling members 11.

Thus a parachute pack which includes the elements that have been described above may be packed under such conditions and in such an atmosphere that it may be stored for great lengths of time without the necessity for unpacking and airing of the canopy and this because of the removal of the deleterious material from the interior of the container, and yet the pack maintaining its relatively soft or flexible form will be ready for instant use.

What I claim is:

1. In a portable parachute pack, a hermetically sealed flexible container, a canopy packed within said container and having means extending through said container for connection with a harness, means for sealing said container at the point through which said last mentioned means extends and means for opening said container to permit the canopy to deploy therefrom.

2. In a portable parachute pack, a flexible container including a hermetically sealed canopy receiving portion, complemental flaps extending from said portion and having interengageable separable fastener elements thereon constructed and arranged to releasably secure said flaps together, means for creating an opening in said canopy receiving portion of sufficient size to permit a canopy to deploy therefrom, means connected with said canopy and extending through said canopy receiving portion of said container for connection with a harness, and means for sealing said canopy receiving portion of said container at the point through which said last mentioned means extends.

3. In a portable parachute pack, a flexible container including a hermetically sealed canopy receiving portion, complemental flaps extending from said portion and having interengageable separable fastener elements thereon constructed and arranged to releasably secure said flaps together, means for creating an opening in said canopy receiving portion of sufficient size to permit a canopy to deploy therefrom, said last mentioned means including a gore which forms a part of said canopy receiving portion and has a definite configuration, means connected with said canopy and extending through said canopy receiving portion of said container for connection with a harness, and means for sealing said canopy receiving portion of said container at the point through which said last mentioned means extends.

4. In a portable parachute pack, a flexible container having a substantially moisture free chamber therein, a canopy and a suspension connector packed within said chamber, said suspension connector extending through said container, means for sealing said container at the point through which said connector extends, and means for opening said container at a location remote from said passage point to permit said canopy to deploy therefrom.

5. In a portable parachute pack, a flexible container having a hermetically sealed, substantially moisture free canopy receiving chamber therein and having a gore (or gusset) therein joined to the main portion of said container by a connection relatively weaker than said gore and said main portion of said container, and means for connecting said canopy to a load.

6. In a portable parachute pack, a flexible container having a hermetically sealed, substantially moisture free canopy receiving chamber therein and having a gore (or gusset) therein joined to the main portion of said container by a connection relatively weaker than said gore and said main portion of said container, means for connecting said canopy to a load, and interengageable flaps on said container for compressing said container and said canopy into a relatively soft compact mass.

7. In a portable parachute pack, a flexible container having an opening sufficiently large to permit a canopy to be inserted therethrough into said container and having a canopy exit opening, said container including a severable flap normally closing said opening and a pilot chute ejector carried by said flap within said container.

8. In a portable parachute pack, a flexible hermetically sealed container having a substantially moisture free gas therein, a canopy packed in said container, said container having a canopy exit opening and a removable closure for the exit opening, means connected with said canopy and extending through said container at a point remote from the canopy exit opening thereof for connection with a harness, and means for sealing said container at the point through which said last mentioned means extends.

9. In a portable parachute pack, a flexible hermetically sealed container having a substantially moisture free gas therein, a canopy packed in said container said container having a canopy exit opening and a removable closure for the same, a pilot chute ejector attached to said closure within said container, means connected with said canopy and extending through said container at a point remote from the canopy exit opening thereof for connection with a harness, and means for sealing said container at the point through which said last mentioned means extends.

10. In a portable parachute pack, a flexible hermetically sealed container having a canopy receiving chamber substantially free of moisture, a canopy packed in said container, said container having a canopy exit opening, a removable closure for the same, means connected with said canopy and extending through said container at a point remote from the canopy exit opening thereof for connection with a harness, and means for sealing said container at the point through which said last mentioned means extends.

11. In a portable parachute pack, a flexible sealed container relatively free of deleterious moisture, a canopy packed in said container, said container having a canopy exit opening, a removable closure for said exit opening, connectors attached to said canopy and extending through the container in fixed space relation to each other for connection to a harness, and means for sealing said container at the points through which said connectors extend.

12. In a portable parachute pack, a flexible sealed container relatively free of deleterious moisture, a canopy packed in said container, said container having a canopy exit opening, a removable closure for said exit opening, connectors attached to said canopy and extending through the container in fixed spaced relation to each other for connection to a harness, means for sealing said container at the points through which said connectors extend, a pilot chute attached to said canopy, and a flexible ejector flap attached to said closure on the inside thereof, said ejector flap and said pilot chute being in rolled up unattached relation to each other.

HAROLD J. MORAN.

REFERENCES CITED

The following references are of record in the file of this patent:

UNITED STATES PATENTS

| Number | Name | Date |
|---|---|---|
| 1,458,586 | McCrosson | June 12, 1923 |
| 1,859,185 | Switlik | May 17, 1932 |
| 2,281,187 | Waters | Apr. 28, 1942 |
| 2,383,293 | Dearstyne | Aug. 21, 1945 |
| 2,389,578 | Quilter | Nov. 20, 1945 |